United States Patent [19]
Li

[11] Patent Number: 5,793,795
[45] Date of Patent: Aug. 11, 1998

[54] METHOD FOR CORRECTING ERRORS FROM A JAMMING SIGNAL IN A FREQUENCY HOPPED SPREAD SPECTRUM COMMUNICATION SYSTEM

[75] Inventor: Xiaojun Li, Boynton Beach, Fla.

[73] Assignee: Motorola, Inc., Schaumburg, Ill.

[21] Appl. No.: 760,354

[22] Filed: Dec. 4, 1996

[51] Int. Cl.[6] .................... H04B 1/69; H04B 1/713
[52] U.S. Cl. .................... 375/200; 375/202; 375/285; 375/275
[58] Field of Search ..................... 375/200, 202, 375/275, 285, 367; 371/37.5, 37.11, 67.1

[56] References Cited

U.S. PATENT DOCUMENTS

| | | | |
|---|---|---|---|
| 4,933,954 | 6/1990 | Petry | 375/202 |
| 5,259,030 | 11/1993 | Francis | 375/202 |
| 5,265,128 | 11/1993 | Widmer et al. | 375/285 |
| 5,282,222 | 1/1994 | Fattouche et al. | 375/219 |
| 5,426,653 | 6/1995 | Hayes et al. | 371/36 |
| 5,450,612 | 9/1995 | Chanroo et al. | 455/38.1 |
| 5,548,582 | 8/1996 | Brajal et al. | 375/202 |
| 5,555,268 | 9/1996 | Fattouche et al. | 375/206 |
| 5,712,868 | 1/1998 | Stern et al. | 375/202 |

*Primary Examiner*—Don N. Vo
*Attorney, Agent, or Firm*—Keith A. Chanroo

[57] ABSTRACT

A selective call communication system (10) has a selective call device (100) for transmitting a frequency hopped spread spectrum signal (320) encoded as Reed Solomon code words and modulated as a four-level frequency shift keying (4FSK) signal. A base site transceiver (156) receives the signal on a plurality of narrow band channels. A digital signal processor (DSP)(152) performs a fast fourier transform on the signal to generate frequency samples. The DSP (152) has a comparator (342) that compares an 4FSK symbol to a predetermined threshold, a determinator (344), in response to the comparator (342), determines when there is an interference signal jamming the narrow band channel, an erasure marker (346) marks a position in the Reed Solomon symbol determined to be jammed as an erasure and an error correcting code (348) corrects errors in the Reed Solomon code words marked with erasures.

23 Claims, 9 Drawing Sheets

$$\begin{array}{|cccc|}
0 & 0 & 0 & 0 \\
1 & 1 & 1 & 1 \\
0 & 0 & 0 & 0 \\
0 & 0 & 0 & 0 \\
0 & 0 & 0 & 0 \\
0 & 0 & 0 & 0 \\
0 & 0 & 0 & 0 \\
1 & 1 & 1 & 1 \\
1 & 1 & 1 & 1 \\
0 & 0 & 0 & 0 \\
0 & 0 & 0 & 0 \\
0 & 0 & 0 & 0 \\
0 & 0 & 0 & 0 \\
0 & 0 & 0 & 0 \\
0 & 0 & 0 & 0 \\
\end{array}$$

FIG. 9

$$\begin{array}{|cccc|}
0.7 & 0.8 & 0.8 & 1.1 \\
1.3 & 1.2 & 1.1 & 0.9 \\
0.9 & 0.6 & 0.03 & 0 \\
0 & 0.7 & 0.5 & 1.1 \\
0.7 & 0.9 & 1.8 & 2.3 \\
2.8 & 1.9 & 1.6 & 0.9 \\
0.04 & 0.03 & 0.7 & 0.9 \\
0 & 3.8 & 2.7 & 1.8 \\
2.1 & 3.1 & 2.9 & 2.8 \\
0.8 & 0.9 & 0.6 & 0.8 \\
1.2 & 0 & 0.04 & 0.7 \\
0.9 & 0 & 0.9 & 2.3 \\
0.3 & 0.8 & 0.7 & 1.9 \\
0.7 & 0.4 & 1.7 & 1.2 \\
1.1 & 0.9 & 0 & 0.02 \\
\end{array}$$

FIG. 11

$$\begin{vmatrix} 0 & 0 & 0 & 0 \\ 1 & 1 & 1 & 1 \\ 0 & 0 & 1 & 1 \\ 1 & 0 & 0 & 0 \\ 0 & 0 & 0 & 0 \\ 0 & 0 & 0 & 0 \\ 1 & 1 & 0 & 0 \\ 1 & 1 & 1 & 1 \\ 1 & 1 & 1 & 1 \\ 0 & 0 & 0 & 0 \\ 0 & 1 & 1 & 0 \\ 0 & 1 & 0 & 0 \\ 0 & 0 & 0 & 0 \\ 0 & 0 & 0 & 0 \\ 0 & 0 & 1 & 1 \end{vmatrix}$$

*FIG. 13*

METHOD FOR CORRECTING ERRORS FROM A JAMMING SIGNAL IN A FREQUENCY HOPPED SPREAD SPECTRUM COMMUNICATION SYSTEM

FIELD OF THE INVENTION

This invention relates in general to communication systems and more particularly to a method for correcting errors from a jamming signal in a frequency hopped spread spectrum communication system.

BACKGROUND OF THE INVENTION

The idea of spread spectrum was first used during World War II to combat intentional jamming and securely exchange information. Spread spectrum systems must meet at least two criteria. First, the transmitted bandwidth should be much greater than the bandwidth or rate of the information being sent, and second, some function other than the information being sent is employed to determine the resulting modulated radio frequency (RF) bandwidth. Thus, the essence of spread spectrum communications involves expanding the bandwidth of a signal, transmitting that expanded signal, and recovering the desired signal by remapping the received spread spectrum into the original information bandwidth for the purpose of delivering error-free information in a noisy signal environment. Numerous schemes have been developed to meet these two requirements, but typically excessive interference, including interference from narrow band interferers cripples such systems.

Spread spectrum consists of two different modulation schemes, namely Direct Sequence Spread Spectrum (DSSS) and Frequency Hopped Spread Spectrum (FHSS). DSSS modulation uses a high rate code to spread the data over a large bandwidth while FHSS modulation involves rapidly changing the carrier frequency of the narrow band data signal. The present invention particularly applies to FHSS systems, but other applications could be contemplated within the scope of the claims.

In 1985, the Industrial, Scientific, and Medical (ISM) bands (three unlicensed bands: 902–928 MHz, 2.4–2.4835 GHz, and 5.725–5.870 GHz) were allotted by the Federal Communication Commission (FCC) for general purpose communication as long as spread spectrum communication is used under part 15 regulations. The FCC decision has had a tremendous impact in the commercial world. Thousands of ISM band devices are now available on the market. Since the spectrum is unlicensed, hundreds of other wireless applications are yet to come. This will cause a dramatic increase in the interference noise level and may cause the collapse of the entire band. The present invention proposes a way to survive in such a noisy environment that further serves as an effective method of interference cancellation.

Thus what is needed is a method and apparatus for reducing or minimizing interference in a spread spectrum communication system.

BRIEF DESCRIPTION OF THE DRAWINGS

FIG. 9 is a matrix representation of the erasure markings for error corrections when the FH signal is jammed according to the preferred operation of the invention.

FIG. 11 is a matrix representation of the erasure markings for error corrections when the FH signal is in a fade according to the preferred operation of the invention.

FIG. 13 is a matrix representation of the erasure markings for error corrections when FH signal is in a fade and/or when the FH signal is jammed according to the preferred operation of the invention.

DESCRIPTION OF A PREFERRED EMBODIMENT

Figure 1:
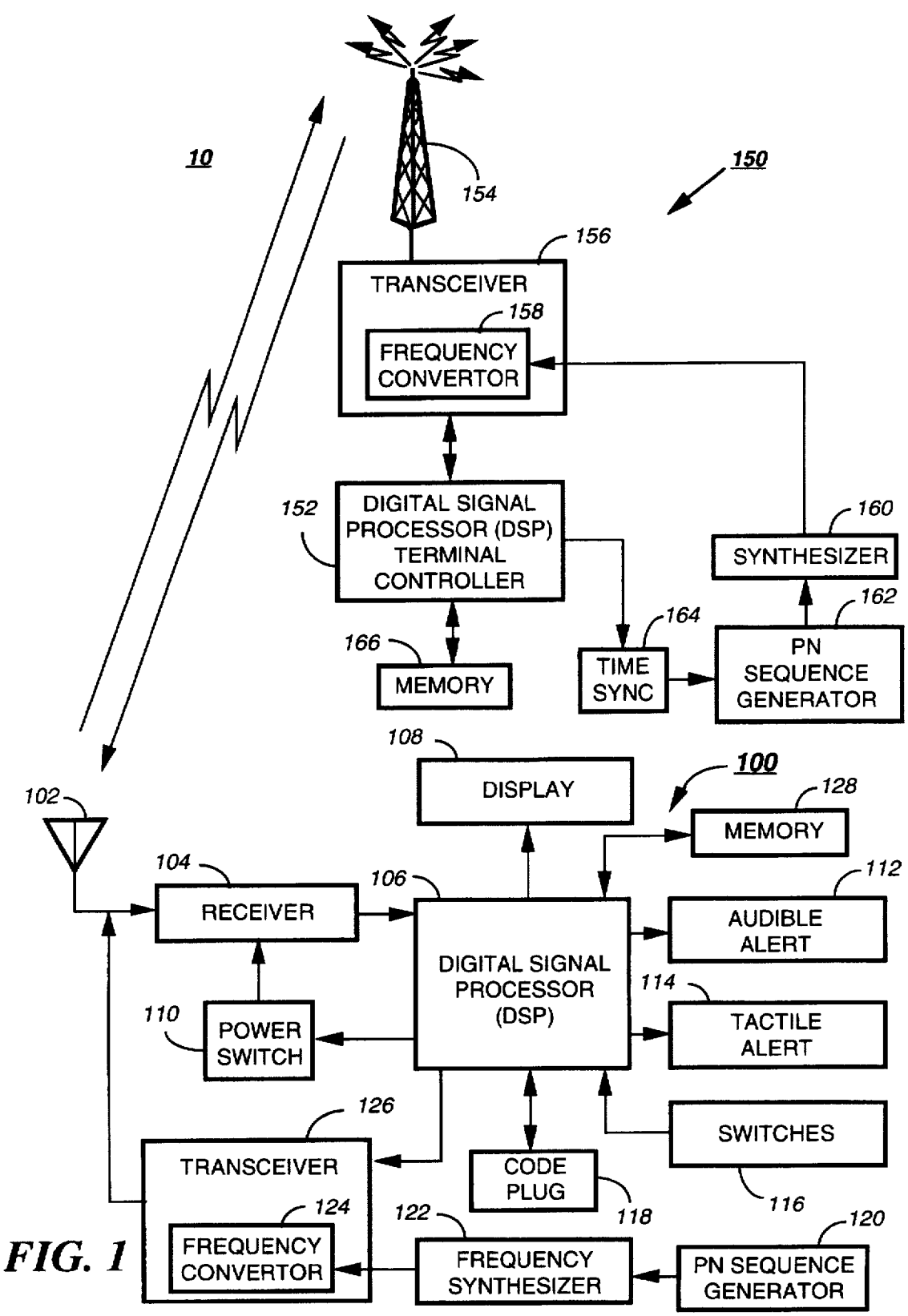
FIG. 1 is an electrical block diagram of a frequency hopped spread spectrum selective call communication system in accordance with the preferred embodiment of the present invention.

Referring to FIG. 1, a selective call system (selective call communication system) is shown as a frequency-hopped (FH) spread spectrum selective call system 10 illustrating a base site terminal 150 and a selective call device 100 in accordance with the preferred embodiment of the present invention. The selective call terminal 150 comprising a terminal controller 152 coupled to a base site transceiver 156. The terminal controller 152 receives messages from an input device, for example a telephone, computer or an alpha-entry device or the like (not shown) and via the transceiver 156 and antenna 154 transmits the messages to the selective call device 100. A received message (or information) is processed by encoding the message with an address designating the selective call device 100 as is well known in the art. The encoded message is then passed to the antenna 154 which transmits (or receives) radio frequency (RF) message to (or from) the selective call device 100. The transceiver 156 is coupled with or comprises a mixer or a frequency convertor 158 well known in the art. The mixer 158 is coupled to a frequency synthesizer 160 for enabling the transceiver 156 to tune or select a plurality of frequencies to receive (or transmit) selective call message on the plurality of frequencies. As is well known, a frequency hopped spread spectrum communication system hops (or switches) to the plurality of frequencies where portion of the message or information is transmitted and/or received. A pseudo random (PN) sequence generator 162 generates a sequence of numbers under the control of a time synchronizer 164 which is synchronized with an PN generator of a transmitter in the selective call device. The values of the sequence that are generated by the PN sequence generator 162 are used by the frequency synthesizer 160 and the mixer or a frequency convertor 158 to tune the transceiver to the different frequencies (or hops) of the frequency hopped spread spectrum signal where different portions of the message are transmitted in each of a plurality of hops.

In a frequency-hopped (FH) spread spectrum communication system, the information is transmitted and received over a wide band frequency, e.g., the Industrial, Scientific and Medical (ISM) band. There are three ISM bands, 902–928 MHz, 2400–2483.5 MHz and 5725–5850 (MHz). For selective call reverse channel, it is preferred to operate at 902–928. However, applications of the invention is not limited to this band. As is well known, a frequency hopped communication system uses a spread spectrum technique because the data-modulated carrier hops from one narrow-band frequency channel to another frequency randomly within a specified wideband frequency. Those frequency hoppings are controlled by a random sequence generator to enable frequency hopping over a plurality of narrow band channels. A corresponding receiver is capable of duplicating the same random sequence as well as the random carriers. In the FH spread spectrum system, Forward Error Correction (FEC) is always important. With the FEC, the message that is recoverable by FEC when some of random channels (or carriers) are jammed by interferences and/or fading. Two basic characters of FH systems are Slow-frequency hopped (SFH) and Fast-frequency Hopped (FFH). The SFH system transmits several symbols in each frequency hop and the FFH system will hop several times during the transmission of one symbol.

Figure 2:
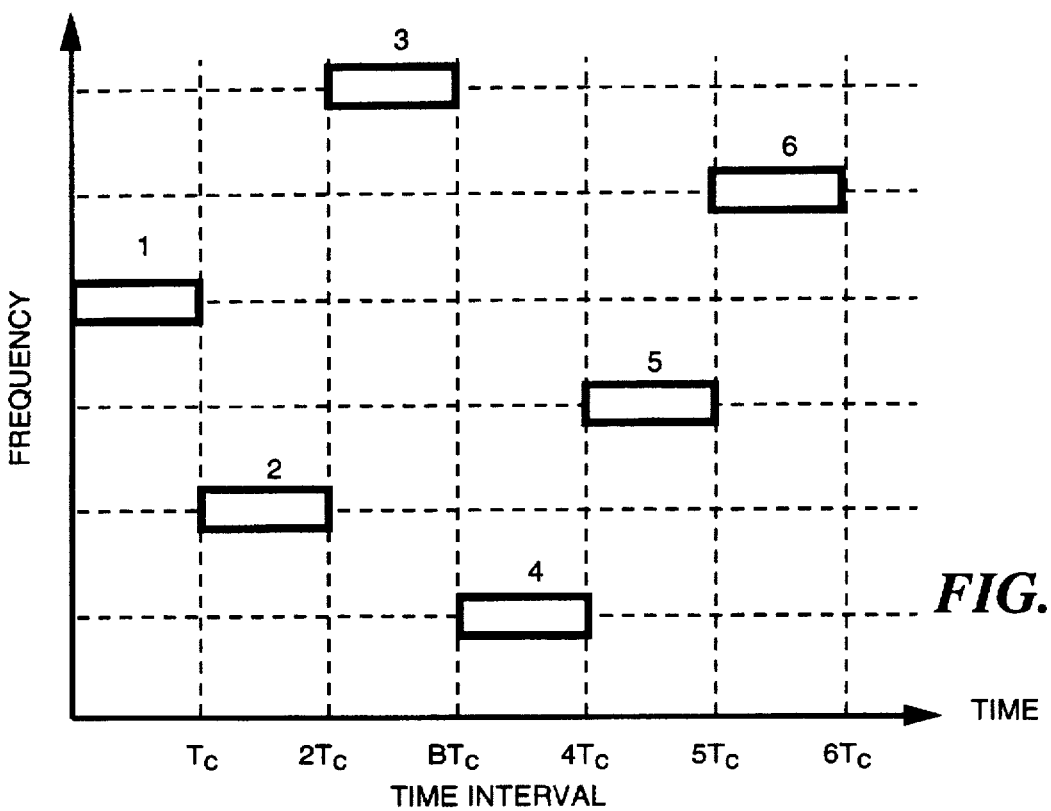
FIG. 2 is a graphical representation illustrating a particular frequency hopped pattern in the time-frequency plane in accordance to the preferred embodiment of the present invention.

Referring to FIG. 2, a graphic representation is shown illustrating an example of particular frequency hopped pattern in a time-frequency plane. The graph is an example of the frequency hops and the time slots of each hop. The wide band frequency is sub-divided into a plurality of contiguous frequency slots (1–6) over the time intervals (Tc-to-6Tc). For example, in a signaling interval, the transmitted signal occupies one or more of the available frequency slots preferably one frequency slot. The selection of the frequency slot corresponds to the signaling intervals (Tc–6Tc), and are made pseudo-randomly according to the output from the PN sequence generator 162. The frequency synthesizer 160 generates a number corresponding to one of the frequency hop during an appropriate time interval, e.g., Tc, which causes the mixer a frequency convertor 158 to tune to the narrow band frequency slot, e.g., frequency slot or hop 1, to receive the information being transmitted. After the information is received during frequency hop 1, the PN generator 162 generates the next number which causes the frequency synthesizer 160 and the mixer a frequency convertor 158 to tune the transceiver 156 to the next frequency hop 2 during time interval, 2Tc. The PN generator 162 under the control of the time synchronizer 164 continues to generate numbers to cause the frequency synthesizer 160 and the mixer a frequency convertor 158 to tune to, e.g., the other frequency slots 3–6 corresponding to time intervals 3Tc–6Tc. The transceiver 156 receives the information transmitted during the plurality of frequency hops of the frequency hopped spectrum system to receive the information or message that is transmitted by the selective call device. The message or information is stored in memory 166.

The selective call device 100 (e.g., a selective call receiver with an acknowledge back transmitter) transmits an inbound signal as a frequency hopped (FH) signal in response to the receipt of a message from the base site terminal 150. The outbound signal from the base site terminal can be received on any other signaling protocol, preferably the FLEX™ protocol. The inbound signal bandwidth for each hop is equal to bandwidth of M-ary FSK modulated signal. The inbound FH signal, according to the preferred embodiment, is modulated as a four-level frequency shift keying (4FSK) signal and encoded as a Reed Solomon code word "RS (15,5)". The designed system employs the 4FSK at 400 symbols per second (800 bits-per-seconds). Preferably, the signal bandwidth for each hop is 3.125 KHz. The preferred message length of the selective call reverse channel is 80 bits. Every 20 bits are encoded in to a (15,5) Reed-Solomon code word, RS(15,5). There are total 4 code words for each message. Reed-Solomon code is well known in the art as a non-binary Bose Chaudhuri-Hocquenghem (BCH) code. It is well known that other code words could be used as well. The RS(N, K) is a code that encodes K information symbols into a code word with N symbols. The N symbols are equal (N)=2^m−1 in which m is number of bits in each symbol. The RS code word can correct a total number of errors (t), and number of erasures (e), if 2t+e is less than (N-K)+1. An error is defined as a transmission error whose both location and value are unknown, and an erasure is defined as an error whose location is known but whose value is unknown. For example, an RS(15,5) code word has total 15 symbols in which 5 are information symbols. Each symbol has 4 bits. The RS(15,5) code word can correct a 5 symbol errors without any erasure. However it can correct up to 10 transmission errors if they are correctly marked as erasures. The increase capability is obtained because the location of the errors are known.

The selective call device 100 comprises an antenna 102 that provides an RF carrier signal to the receiver 104. The receiver 104 generates a recovered signal suitable for processing by a digital signal processor ("DSP") 106 in a manner well known to one of ordinary skill in the art. The DSP 106 performs function such as encoding and decoding messages and controlling the operation of the selective call device 100 well known to one of ordinary skilled in the art. The DSP 106 processes the received signal to decode the address and compares the decoded address with one or more predetermined addresses contained in a memory, for example, a codeplug 118. When the addresses are substantially similar, the user is alerted that a signal has been received either by an audio alert (e.g., a speaker or transducer) 112 or a tactile alert (e.g., a vibrator) 114. The received signal may also include optional message data directed to some selective call device. Also, if the selective call device 100 includes an optional voice output, recovered audio components of the received RF signal may be presented. For a message selective call device, the recovered message is stored in a memory 128 for subsequent presentation by an output device which for example is a display 108. The output device will automatically, or when manually selected by switches 116, present the message, such as by displaying the message on the display 108.

For an acknowledge-back selective call receiver 100 (or two-way selective call device), a signal is transmitted either automatically or manually in response to the receipt of the selective call message (or signal) by the selective call device 100. The user, in the case of a manual response, uses the switches 116 to select a message from, for example, one of a number of prestored message in memory 128 to be sent to the originator. The message is then encoded by the DSP 106 and passed to a transmitter 126 for transmission by the antenna 102. Preferably, the message is modulated by the DSP 106 and encoded in the RS (15,5) code word in a manner well known in the art. The DSP modulates in RS code word to the 4FSK signal for transmission. After the signal is encoded and modulated and according to the preferred embodiment of the present invention, a PN sequence generator 120 generates a sequence which is used by the frequency synthesizer 122 to generated a frequency output. The frequency output is provided to a mixer a frequency convertor 124 which sets the frequency of the transmitter 126 to, e.g., frequency slots 1-to-6during the time intervals, Tc–6Tc. The transmitter 126 transmits different portions of the message during the frequency slots 1–6 until the entire message is received at the base site terminal 150. It is understood that the PN sequence generator 162 at the base site controller 152 is identical to the PN generator 120 at the selective call device 100. The time synchronizer 164 synchronizes the transceiver at the base site terminal 150 to the transmitter 126 at the selective call device 100 in a manner well known in the art.

Figure 4:
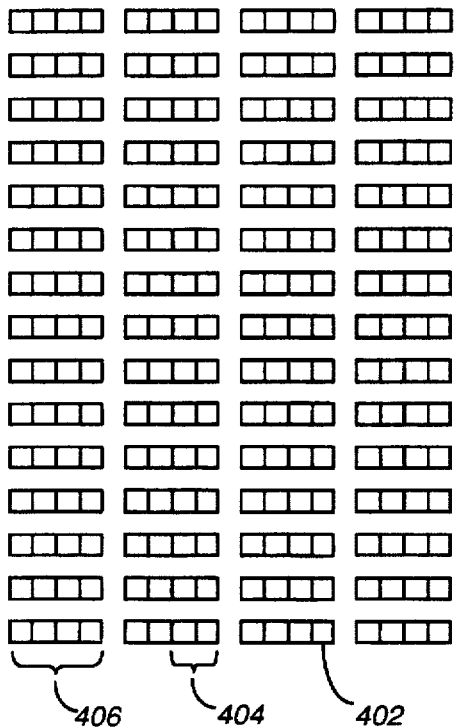
FIG. 4 is a matrix representation of the code words being interleaved according to the preferred embodiment of the present invention.
Figure 3:
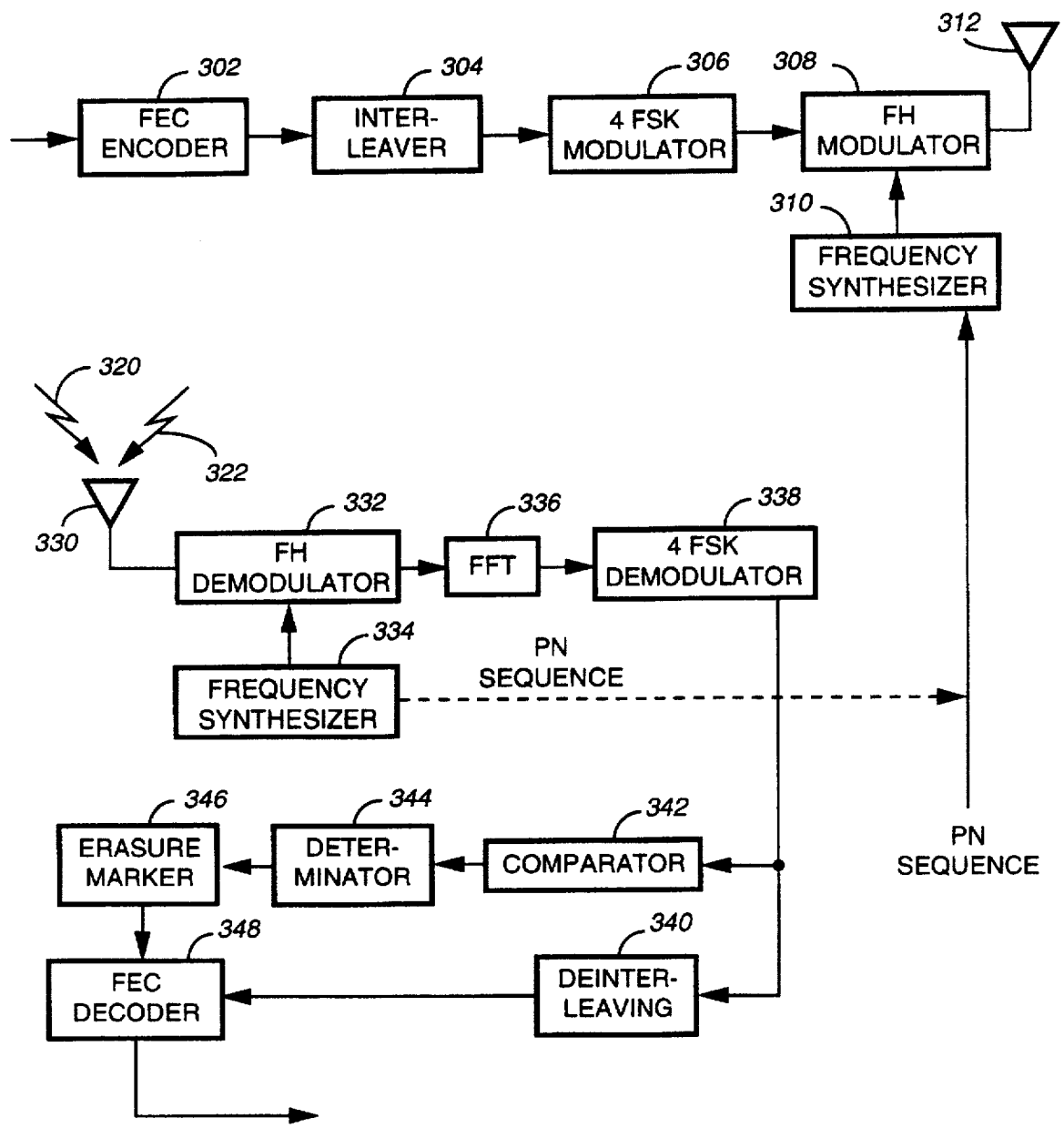
FIG. 3 is a function block diagram of a selective call device and the terminal transceiver according to FIG. 1.

Referring to FIG. 3, a functional block diagram of the FH receiver (receiver at the base site terminal 150) and FH transmitter (the transmitter at the selective call device 100) are shown according to FIG. 1. A forward error correction (FEC) encoder 302 encodes the information or message of the selective call device 100 to the RS (15,5) code word. The resulting RS code word is interleaved by the interleaver 304 generating interleaved frequency hopped spread spectrum signal. Referring to FIG. 4, the interleaver 304 forms a fifteen-by-four matrix. Each column of the matrix represents a RS code word. There are four columns representing four RS code words. Four RS code words are stored columns-wise and transmitted row-wise. The matrix is stored in memory 128 (FIG. 1) before transmission. Each block represents a bit 402, two blocks (or two-bits) represent the 4FSK symbol 404, and four blocks (or four-bits) represent the RS symbol 406. The memory 128 capable of storing the four RS symbols and other received outbound messages.

Figure 5:
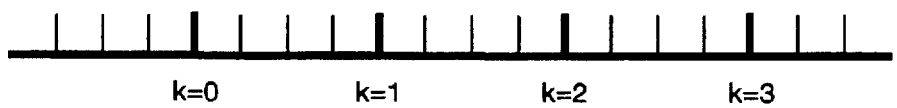
FIG. 5 is a frequency output illustrating the frequency offset of the 4-level FSK symbols according to the preferred embodiment of the present invention.

According to FIG. 3, the 4FSK modulator 306 modulates each bit into the four-level-FSK (4FSK) signaling scheme. Referring to FIG. 5, the index k=0, 1, 2 and 3 mark the frequency deviation of the 4FSK signal. Each index corresponds to one of the four frequency offset of the 4FSK signal. An FH modulator 308 modulates portions 4FSK signal, e.g., each row of the matrix (FIG. 4), onto one of the frequency slots of the frequency hopped spread spectrum signal. The PN sequence generates a number which is used by the frequency synthesizer 310 to generate the frequencies corresponding to the frequency slots of FIG. 2. During each hop, a row of the matrix of FIG. 4 is transmitted by the transmitter 312. Each row corresponds to four RS symbols or eight-4FSK symbol. For example, during time period of Tc, row 1 of the matrix is transmitted and during time period 2Tc, row 2 of the matrix is transmitted and so on.

The data or FH signal 320 is transmitted as an radio frequency signal over a wireless channel that it is susceptible to interference 322 in the form of other signals jamming the narrow bands signal. The interference 322 also includes fading, multipath fading, or random type errors well known to one of ordinary skill in the art.

A receiver 330, e.g., at the base site controller receives the FH signal 320 plus the interference. An FH demodulator 332 is coupled to a frequency synthesizer 334 which receives a PN sequence similar to and is synchronized to the PN sequence of the transmitter (selective call device 100). The PN sequence is shown connected via a dotted line to the PN sequence of the transmitter to illustrate that the PN sequence is synchronized to the transmitter. In order to modulate the 4FSK signal, a fast fourier transform (FFT) 336 is applied to each 4FSK symbol. As is well known, the sampling frequency of the signal must be sufficiently fast satisfy the Nyquist rate well known to one of ordinary skill in the art. For example, an L points FFT is required, where L equals the sampling frequency multiplied by the sample duration. Preferably, the symbol rate is 100 4FSK symbols-per-second to 800 4FSK symbols-per-second, the higher symbol rate requires a faster computational speed of the DSP. A sample rate of four times the symbol rate is preferred to ensure that 4FSK symbols are correctly decode.

As is well know, a sample-and-hold circuit (not shown) samples the time domain signal and an Analog-to-digital convertor (ADC) converts the time sample to a digital values before the FFT transforms the digital time domain signal into a frequency domain signal suitable for use by an 4FSK demodulator 338 for demodulating the 4FSK signals. The FFT samples comprise a plurality of frequency samples.

Figure 6:
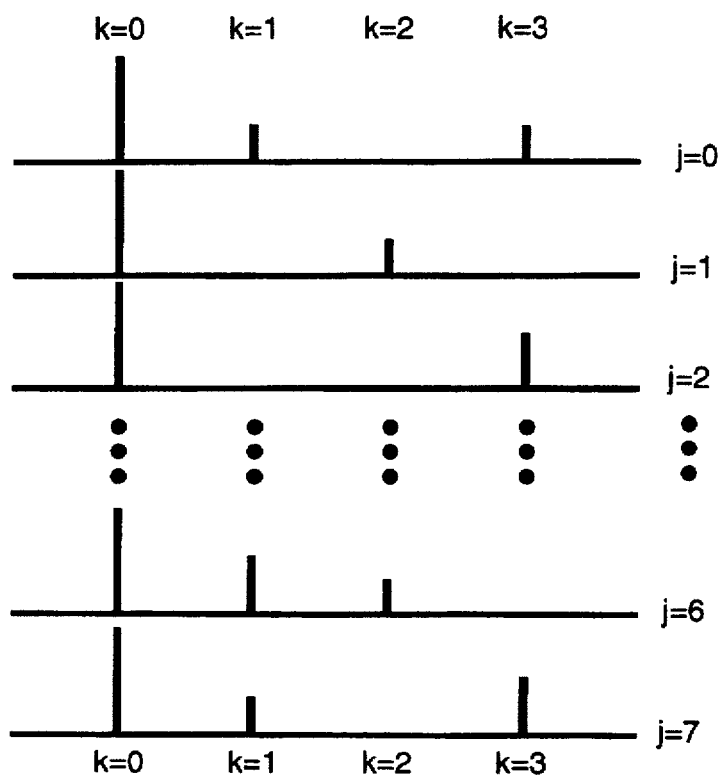
FIGS. 6 and 7 represent the frequency domain output of the 4FSK frequency deviations according to the preferred embodiment of the present invention.
Figure 7:
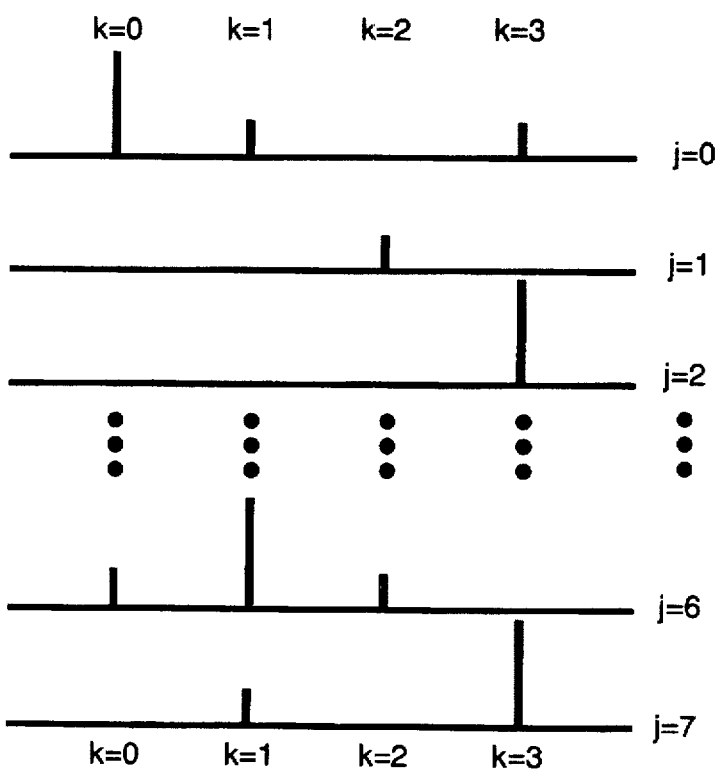

Referring to FIGS. 6 and 7, the frequency domain output is shown as a representation of the 4FSK deviations or offsets indicated by the indexes k=0, 1, 2 and 3 which correspond to center of each of the four frequency deviations of the 4FSK symbols. The 4FSK demodulator 338 demodulates the 4FSK symbols after the FFT transforms the time domain signal to the frequency domain representation thereof for demodulating the 4FSK signal in frequency domain from a subset of frequency samples. The frequency derivation of the 4FSK signal is represented as Fj, k, where the index jth corresponds to the each frequency hop containing the information shown in the rows of the matrix of FIG. 4.

The 4FSK demodulator 338 generates a four-by-J (4×J) matrix that is stored in memory 166 (FIG. 1). A comparator 342 measures the energy, magnitude, or value of the frequency offset or frequency deviation of the 4FSK symbols corresponding to the k=0–3 intervals for all J values where J=0 to 7, the number of 4FSK symbols transmitted in each frequency hop. The comparator 342 compares the measured frequency offset with a predetermined threshold, the details of determining the predetermined threshold will be discussed below. A determinator 344 determines that a 4FSK symbols are jammed when there is no or very little variation in the magnitude or energy of the FFT output from symbol-to-symbol at a frequency deviation or offset. As is well known, a narrow band interference signal could block or jam the entire signal contained in a frequency hop.

Referring to FIG. 6, when a frequency slot or hop is jammed, the energy or magnitude of the 4FSK offset frequency, e.g., the frequency offset corresponding to the interval k=0, the each the eight 4FSK symbols indicates a magnitude or energy substantially equal to all eight 4FSK symbols for the k=0 interval and the energy of the k=0 interval is substantially greater than the energy in the other frequency offsets of k=1 to 3.

Referring to FIG. 7, in normal environment when the signal is not jammed, the magnitude or energy of the FFT output will vary from frequency offset-to-frequency offset across all the eight-4FSK symbols transmitted in the frequency hop. As illustrated, the energy or magnitude of the 4FSK offsets k=0 to 3 for all the eight 4FSK symbols vary substantially between the k=0 to 3 indexes and the J=0 to 7 indexes.

Returning to FIG. 3, an erasure marker 346 marks all the location of the bits that have a high probability of errors, the erasure marking will be discussed in details below. A de-interleaver 340 de-interleaves the data, and the results of the erasure marker 346 and the deinterleaver 340 are passed to an FEC decoder 348 which performs error correction for correcting errors based upon an interference by a jamming signal and fading. The error correction will be discussed in greater details below.

Figure 8:
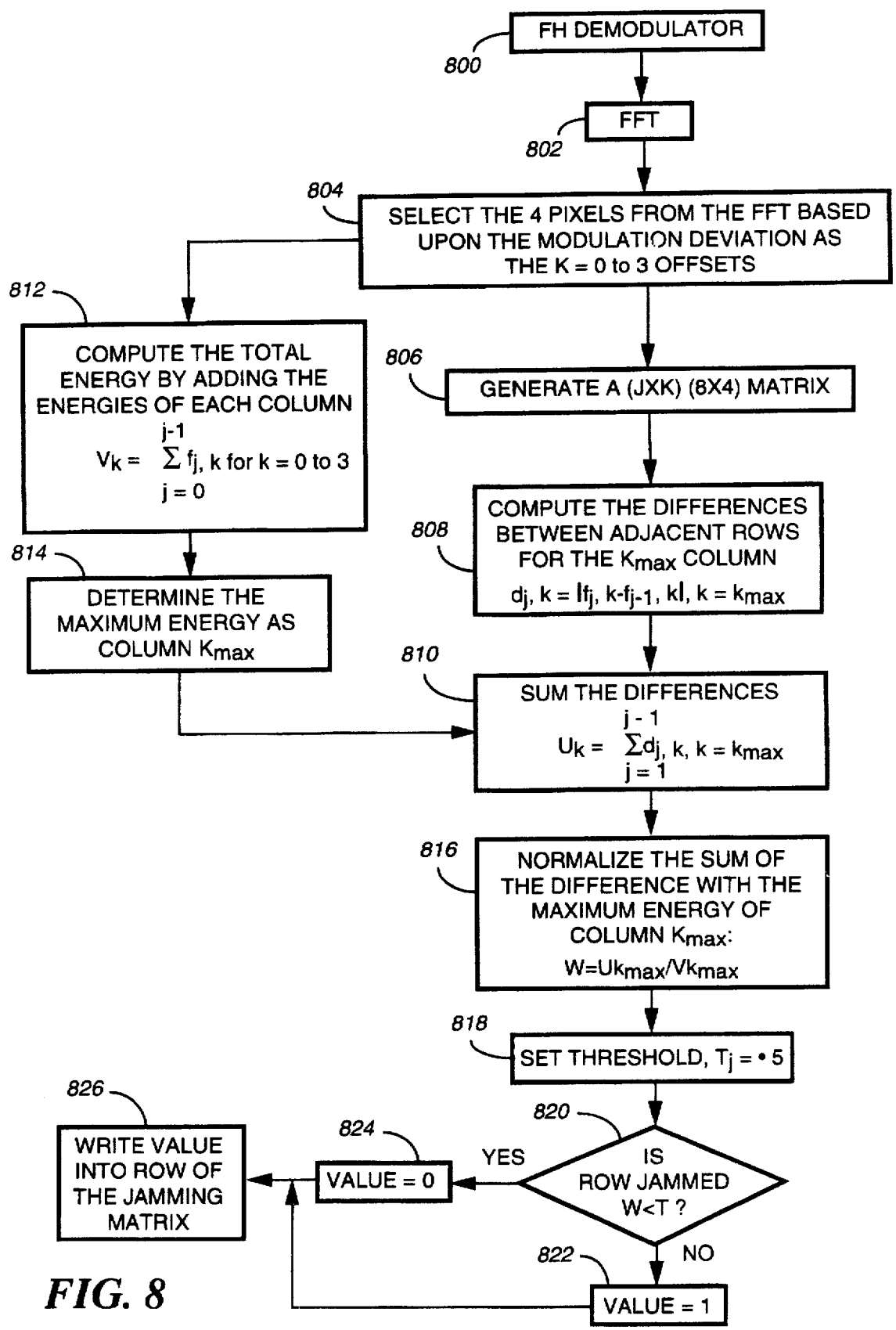
FIG. 8 is a flow diagram illustrating the operation of the terminal controller determining when a channel is jammed in accordance with the preferred embodiment of the present invention.

Referring to FIG. 8, a flow diagram is shown illustrating the operation of the terminal controller determining when a channel is jammed by an interference. When a signal is received by the receiver at the base site, the FH demodulator demodulates the FH data from the plurality of frequency hops, step 800. As is well known, the demodulated data is sampled and then passed to the FFT for converting the time-domain signal to a frequency-domain signal, step 802. From the magnitude or energy values corresponding to the samples from the FFT, the offsets corresponding to the 4FSK symbol, k=0-3, are selected based upon the frequency deviation of the 4FSK, step 804. A matrix representation of the data is generated and stored as a matrix, step 806. The matrix has a eight rows and four columns, the eight rows correspond to the number of bits of each row of the interleaved matrix of FIG. 4 and the four columns correspond to the number of 4FSK offsets or frequency deviations, k=0-to-3. The difference between adjacent rows of the matrix are computed for each of the k=0-3 indexes [dj,k=abs (fj,k−fj−1,k) ], step 808. The differences are summed for the k=0-3 indexes along the rows of the matrix [Uk=Σdj,k for j=1 to 8 at k=0-3], step 810. The total energy of each column of the matrix is computed by adding or summing the magnitude or energy of each indexes, [Vk=Σfj,k for j=0 to 7 at k=0-3], step 812. The column that has the maximum value is identified or determined as the column with the maximum energy, kmax, step 814. The sum of the difference is divided by the maximum energy of the column, [W=Uk$_{max}$/Vk$_{max}$], step 816. A predetermined threshold value is set as a jamming threshold, Tj, to 0.5, step 818. If the sum of the difference divided by the maximum energy of the column, W, is greater that the jamming threshold, Tj, then the row had not experienced a jamming signal during transmission, step 820. The corresponding value is set to zero, step 824, and that value is written to a jamming matrix, step 826. When the sum of the difference is divided by the maximum energy, W, is greater than or equal to the jamming threshold, Tj, step 820, the value is set to one and the result is written to a jamming matrix, step 820. The result is repeated until all the data has been processed and a matrix is generated with the RS symbols are marked as having a high probability of being in error.

Referring to FIG. 9, a matrix representation of the decoded 4FSK symbols is generated to determined which hop of the FH signal was jammed by an interference signal during transmission. When it is determined that a column of the matrix is jammed, the jamming matrix generated with all ones in the row corresponding to the location of the matrix of step 806 of FIG. 8. Similarly, when a hop is determined to have not been jammed by interference during transmission, the jamming matrix is generated with all zeros in the row corresponding to the position of the hop. Referring to the jamming matrix, the second, eighth and ninth rows were determined to be jammed by interference.

Figure 10:
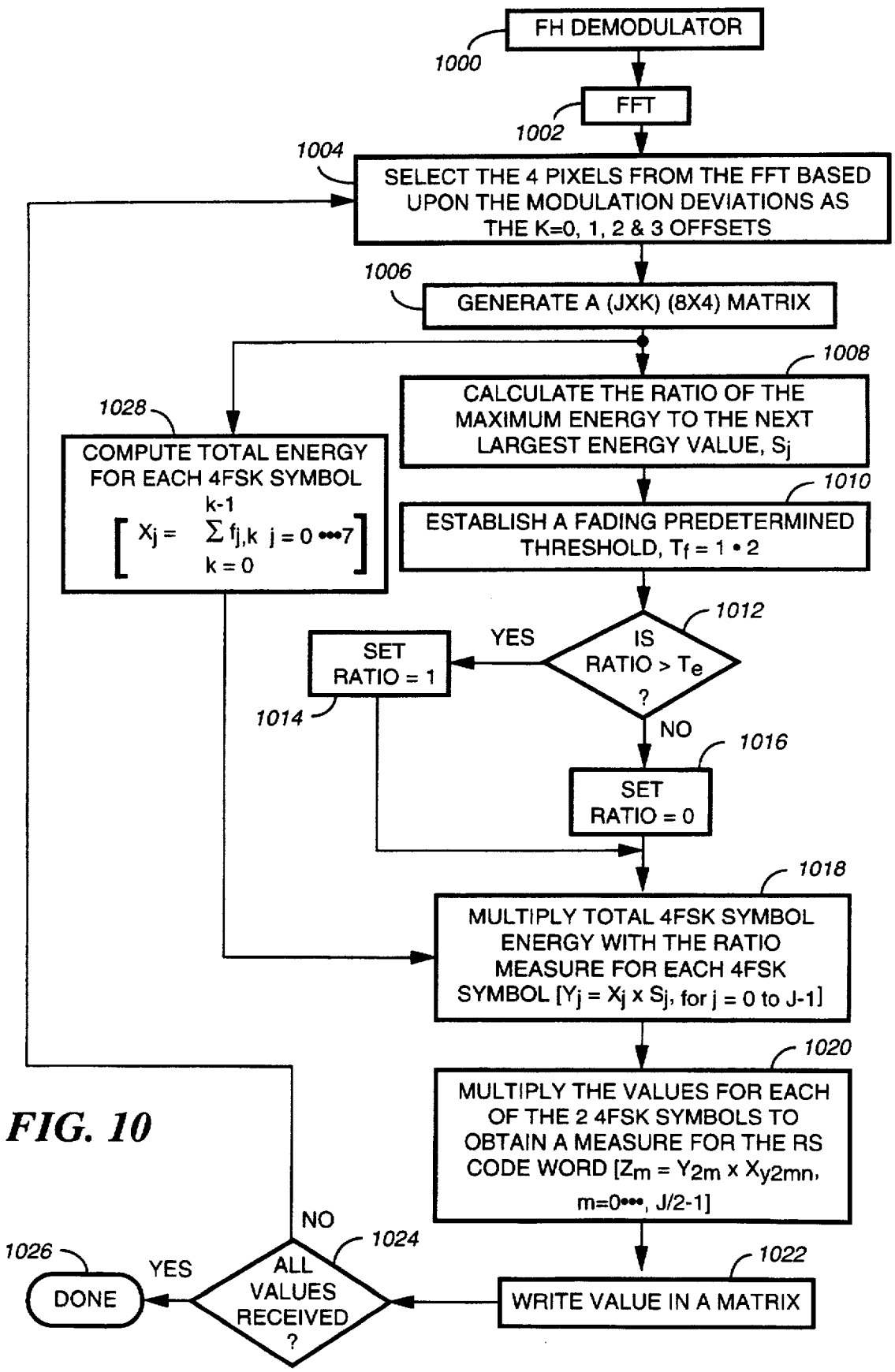
FIG. 10 is a flow diagram illustrating the operation of the terminal controller determining when a channel is in a fade in accordance with the preferred embodiment of the present invention.

Referring to FIG. 10, a flow diagram is shown illustrating the operation of the terminal controller for determining when a channel is in a fade in accordance with the preferred embodiment of the present invention. When a signal is received by the receiver at the base site, the FH demodulator demodulates the FH data from the plurality of frequency hops, step 1000. As is well known, the demodulated data is sampled and then passed to the FFT for converting the time-domain signal to a frequency-domain signal, step 1002. From the magnitude or energy values corresponding to the samples from the FFT, the offsets corresponding to the 4FSK symbol, k=0-to-3, are selected based upon the frequency deviation of the 4FSK symbol, step 1004. A matrix representation of the data is generated and stored as a matrix, step 1006. The matrix has a eight rows and four columns, the eight rows correspond to the number of bits of each row of the interleaved matrix of FIG. 4 and the four columns correspond to the number of 4FSK offsets or frequency deviations, k=0-to-3. The maximum energy or magnitude value and the next largest energy or magnitude value of the frequency deviations are determined for each row of the matrix, and the ratio of the maximum energy to the next largest energy is determined, Sj, step 1008. A predetermined threshold is set or established as the eye-opening threshold value equal to 1.2, step 1012. In step 1012, when the ratio is determined to be greater than the eye-opening threshold (1.2), the ratio is set to 1, step 1014. Alternatively, when the ratio is determined to be less than the eye-opening threshold, step 1012, the ratio is set to zero, step 1016.

The total energy is computed for each of the 4FSK symbols by the formula [Xj=Σfj,k for j=0 to 7 at k=0-3], step 1018. The total energy of the 4FSK symbol is multiplied by the ratio of each 4FSK symbol by the formula [Yj=Xj,k×Sj for j=0 to 7], step 1020. Each adjacent pair of the 4FSK symbols are multiplied together to obtain an energy measure for the RS (15,5) code word since each RS symbol comprises two 4FSK symbols which appear adjacent to each other in the matrix. The value is written to a fading matrix in the corresponding location, step 1022. In step 1024, it is determined whether fading matrix is completely generated, and if so the programs fading determination ends, otherwise, the process returns to step 1004 to repeat until the fading matrix is completely generated, step 1004.

Referring to FIG. 11, a matrix representation of the decoded 4FSK symbols is generated to determined which hop or hops of the FH signal was in a fade during transmission. The total energy of the RS symbol is measured and weighted against the ratio of two largest magnitude values of the 4FSK symbols to determine when the probability of a fade during transmission. The lower the values of the fading matrix the higher the probability that RS symbol experienced a fade during transmission.

Figure 12:
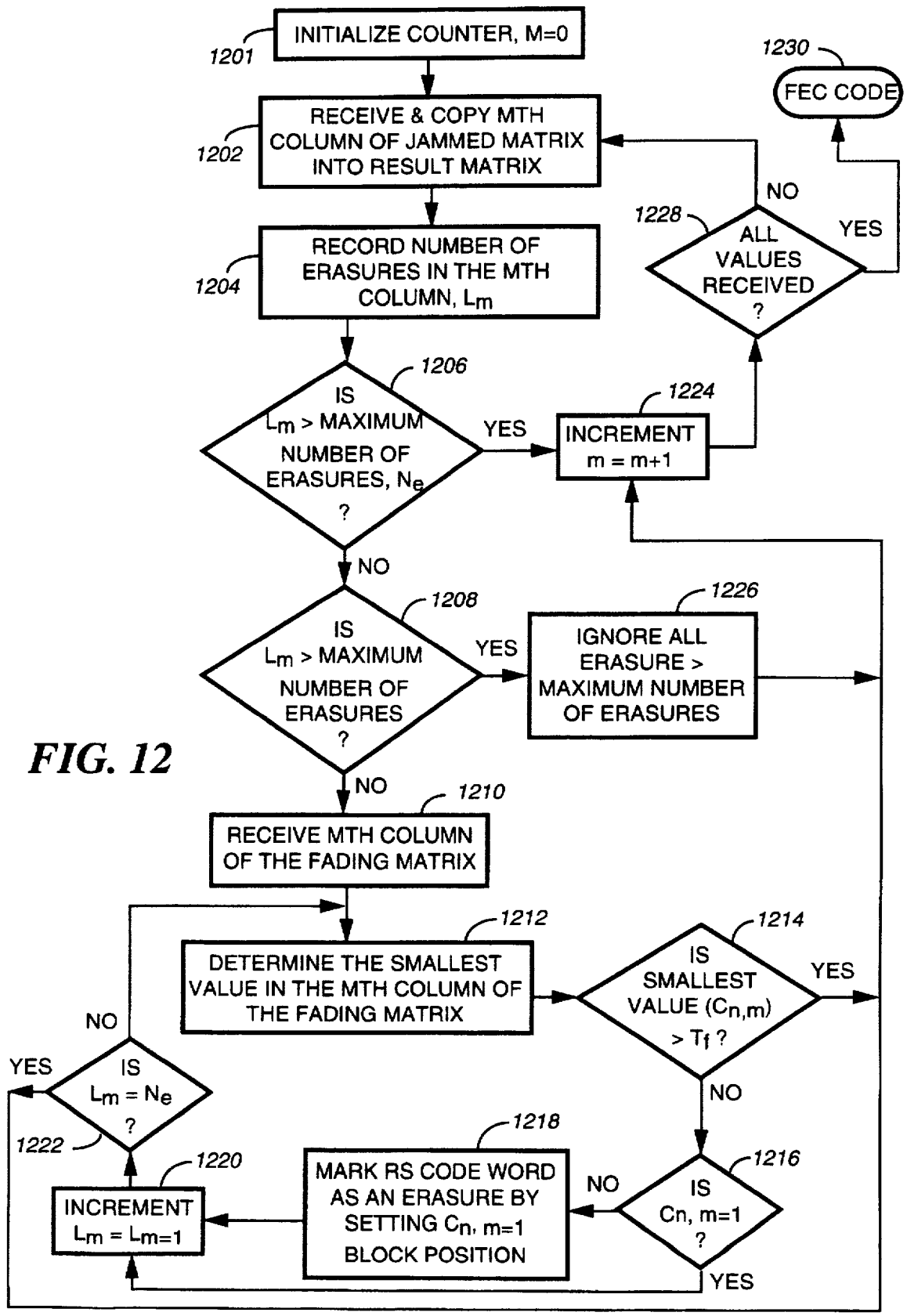
FIG. 12 is a flow diagram illustrating the operation of the terminal controller for correcting errors resulting from a jammed and/or a fading signal interference in accordance with the preferred embodiment of the present invention.

Referring to FIG. 12, a flow diagram is shown illustrating the operation of the terminal controller for correcting errors resulting from a jammed and/or a fading signal interference in accordance with the preferred embodiment of the present invention. A counter, M, is initialized to zero, step 1201, and the Mth column of the jamming matrix of FIG. 9 is received and stored in a result matrix, step 1202. The values of the jamming matrix are checked, and the number of erasures are recorded as Lm, step 1204. As discussed before, the RS code words were interleaved to reduce the impact from errors such as high energy jamming signals and fading. Each RS code word are stored column-wise but transmitted row-wise from in the matrix therefore when a frequency hop experiences an interference signal, the errors will distributed across the four RS code words.

As is well known in the art, when the locations of the errors can be determined, the number of errors that can be corrected are increased. This method is termed soft decoding error correction code or soft decoding error correcting code. As set forth above, the RS (N=10, K=5) code word can correct a total number of errors (t), and number of erasures (e), if 2t+e is less than (N−K)+1=(15−5)+1=11. An error is defined as the transmission errors whose both location and value are unknown, and an erasure is defined as an error whose location is known but whose value is unknown. For example, RS(15,5) has total 15 Reed Solomon symbols in which 5 are information symbols. Each symbol has 4 bits. The RS(15,5) code word can correct a 5 symbol errors without any erasure. However, in this embodiment, the RS code codes are allowed to correct up to 10 transmission errors if they are correctly marked as erasures. The increase capability is obtained because the location of the errors are known.

The jamming matrix of FIG. 9 allows the position of 4FSK symbols to be identified as having a high probability of errors. The maximum number of erasures is set preferably to ten. The number of positions corresponding to 1's in each column is calculated or accumulated and step 1206 checks if the number of erasures is equal to the ten, the maximum number of erasures. If not, the number of erasures are checked to determine of it exceeds the predetermined number of erasures, step 1208. The predetermined number of erasures can be any number equal to or less than the error correcting capability of the soft decoding error correcting code. If so, all erasures that exceeds the maximum number of erasures are ignored, step 1226. When the number of erasures does not exceed the maximum number of erasures, step 1208, the Mth column of the fading matrix of FIG. 11 is received, step 1210. An additional number of errors or erasures can be corrected when the maximum number of erasures were not exceeded in the jamming matrix. The number addition erasures equals to the maximum number of erasures less the actual number of erasures accumulated in the corresponding column of the jamming matrix. To determine other erasure candidates in the fading matrix, the smallest values of the fading matrix are located in the Mth column of the fading matrix, step 1212. The smallest values are check to determine if they are greater than a fading threshold, step 1214. The fading threshold set to equal to 0.05. If no, the value is checked to see if it is equal to one, step 1216. If no, the RS symbol is identified as an erasure, and the value is set to one, step 1218. Once an erasure location is determined that position in the fading matrix is blocked to prevent the same position to be selected again. The number of erasures, Lm, is incremented by one, step 1220. Step 1222 checks to determine if the number of recorded erasures, Lm, is equal to the maximum number of erasures. If no, the process returns to step 1212 to locate other erasures. If the recorded number of erasures is equal to the maximum number of erasures, step 1222, or if the smallest value of the fading matrix is greater than the fading threshold, step 1214, or if the recorded number of erasure from the jamming matrix is equal to the maximum number of erasure, step 1206 or continuing from step 1226, the counter, M, is incremented by one to select the next column of the jamming and/or fading matrixes, step 1224. At step 1228, it is determined if all the columns of both matrixes have been processed. If so, the errors are corrected according to the marked erasures, step 1230. If no, the process repeats itself from step 1202 until all the data have been processed.

Referring to FIG. 13, a matrix representation is shown with the erasures markings for error correction when the FH signal is in a fade and/or when the FH signal is jammed according to the preferred operation of the invention. When this matrix is compared with the jamming matrix of FIG. 9, this matrix will have more positions with 1's because there was fading in the channels. The fading matrix indicates the RS symbols that have a high probability of error. The error position of the jamming matrix and the error positions of the fading matrix are combined and are indicated as 1's in this matrix. Therefore, the FEC decoder uses the matrix error indications to determine which RS symbols of the data has a high probability of error and those positions are marked as erasure.

In this way, the message is modulated as four level frequency shift keying and encoded as Reed Solomon code words. A number of RS code words preferably four are stored in a matrix column-wise and the RS symbols are transmitted row-wise to achieve data interleaving to minimize burst type errors. The four RS symbols are transmitted by frequency hopped spread spectrum in a plurality of hops. Each hop is received and the 4FSK symbols are checked interference form jamming signals. The four RS symbols includes eight 4FSK symbols. Each 4FSK symbol has two bits corresponding to the four frequency deviations of 4FSK modulation. A matrix representation of each hop is generated as (8×4) matrix where the 8 rows represents the number of 4FSK symbols per hop and the four column represent the number of bits per-4FSK symbols. An FFT is done on each 4FSK symbols and the results are use to determine if the signal experienced interference by a jamming signal or a fading signal. Two matrixes are generated to represent the RS symbols that are most likely to be in error and the results are combined to identify each of those position as an erasure to enable an forward error correction block to correct the errors in the data.

As set forth, the inbound channel of the selective call system will operate in the ISM band which was approved for frequency hopped spread spectrum communication systems. It is anticipated that there will be numerous other systems operating in the ISM band which will cause interference, therefore this method and apparatus will correct any errors resulting from jamming signals (other FH systems) fading or random-type errors.

In summary, in a spread spectrum communication system, a method for determining when at least one channel is jammed by an interference signal. The method comprises the steps of: receiving a signal modulated as a four level frequency shift keying (4FSK) signal and encoded as a Reed Solomon code word and transmitted as a frequency hopped spread spectrum signal on a plurality of narrow band channels, performing a fast fourier transform (FFT) on 4FSK samples of a frequency hopped spread spectrum signal for generating a frequency domain signal comprising a plurality of frequency samples, comparing an energy at each frequency deviation corresponding to the 4FSK samples to a predetermined threshold, determining, in response to the step of comparing, when there is an interference signal jamming a narrow band channel of the plurality of narrow band channels, marking as an erasure a Reed Solomon symbol of the Reed Solomon code words including the 4FSK samples being determined to be jammed and error correcting the Reed Solomon code word with erasures being marked for correcting the errors caused by a jamming signal.

I claim:

1. In a spread spectrum communication system, a method for determining when at least one channel is jammed by an interference signal, comprising the steps of:

receiving a signal transmitted as a spread spectrum signal on a plurality of narrow band channels;

converting the spread spectrum signal into a frequency domain signal comprising a plurality of frequency samples;

comparing frequency samples being received in a narrow band channel to a predetermined threshold;

determining, in response to the step of comparing, when there is an interference signal jamming the narrow band channel;

marking the frequency sample determined to be jammed as an erasure; and error correcting the frequency sample with the erasure being marked when at least one channel is jammed by interference.

2. The method according to claim 1 further comprising a step of encoding the signal into Reed Solomon code words.

3. The method according to claim 2 further comprising a step of modulating the Reed Solomon code words as a four-level frequency shift keying signal.

4. The method according to claim 3 wherein the step of converting further comprising a step of performing a fast fourier transform (FFT) on the four-level frequency shift keying signal.

5. The method according to claim 4 wherein the step of comparing further comprising a step of measuring an energy at a frequency deviation corresponding to the four-level frequency shift keying signal wherein the energy at the frequency deviation is compared with the predetermined threshold.

6. The method according to claim 5 wherein the step of determining determines that a narrow band channel is jammed by an interference signal when the energy at any one of the frequency deviation is greater than the predetermined threshold.

7. The method according to claim 6 wherein the step of marking marks a position of a frequency sample as an erasure, and the step of error correcting uses a soft decoding error correction code wherein the position being marked improves the error correcting capability of a Reed Solomon code.

8. The method according to claim 1 wherein the step of marking marks no more than a predetermined threshold of frequency samples corresponding to an error correcting capability of a Reed Solomon code.

9. The method according to claim 1 wherein the spread spectrum signal comprises a frequency hopped spread spectrum signal.

10. The method according to claim 1 further comprising a step of de-interleaving the signal transmitted as the spread spectrum signal.

11. In a spread spectrum communication system, a method for determining when at least one channel is jammed by an interference signal, comprising the steps of:

receiving a signal modulated as a four level frequency shift keying (4FSK) signal and encoded as a Reed Solomon code word and transmitted as a frequency hopped spread spectrum signal on a plurality of narrow band channels;

performing a fast fourier transform (FFT) on 4FSK samples of a frequency hopped spread spectrum signal for generating a frequency domain signal comprising a plurality of frequency samples;

comparing an energy at a frequency deviation corresponding to the 4FSK samples to a predetermined threshold;

determining, in response to the step of comparing, when there is an interference signal jamming a narrow band channel of the plurality of narrow band channels;

marking as an erasure a Reed Solomon symbol of the Reed Solomon code word including the 4FSK samples being determined to be jammed; and error correcting the Reed Solomon code word with erasures being marked for correcting errors caused by a jamming signal.

12. The method according to claim 11 wherein the step of receiving further comprising a step of de-interleaving the Reed Solomon code word.

13. The method according to claim 11 wherein the step of comparing further comprising the step of measuring the energy at the frequency deviation corresponding to the 4FSK signal.

14. The method according to claim 11 wherein the step of determining determines if a narrow band channel is jammed by an interference signal when the energy in at one of the frequency deviation is greater than the predetermined threshold.

15. The method according to claim 11 wherein the step of marking marks a position of a Reed Solomon symbol as erasure, and the step of error correcting further comprises a soft decoding error correction code wherein the position being marked improves the error correcting capability of the Reed Solomon code word.

16. A selective call communication system, comprising:

a selective call device for transmitting a frequency hopped spread spectrum signal encoded as a Reed Solomon code word and modulated as a four-level frequency shift keying (4FSK) signal;

a base site transceiver receives the frequency hopped spread spectrum signal on a plurality of narrow band channels in a pseudo random sequence;

a Digital Signal Processor (DSP) for performing a fast fourier transform on the frequency hopped spread spectrum signal generating a plurality of frequency samples; the DSP further comprising:

a comparator for comparing an 4FSK symbol being received in a narrow band channel to a predetermined threshold;

a determinator, in response to the comparator, for determining when there is an interference signal jamming the narrow band channel;

an erasure marker for marking a position of a Reed Solomon symbol determined to be jammed as an erasure; and error correcting code for correcting errors of the Reed Solomon code word transmitted in the narrow band channel with marked erasure.

17. The selective call communication system according to claim 16 wherein the selective call device comprises a modulator for modulating the signal as the four-level frequency shift keying (4FSK) signal, and an encoder for encoding the 4FSK signal in the Reed Solomon code word.

18. The selective call communication system according to claim 16 wherein the DSP measures an energy at a frequency deviation corresponding to the 4FSK symbol wherein the energy at a frequency deviation is compared with the predetermined threshold.

19. The selective call communication system according to claim 16 wherein the DSP de-interleaves the frequency hopped spread spectrum signal.

20. The selective call communication system according to claim 16 wherein the DSP determines that a narrow band channel is jammed by an interference signal when an energy in any one of a frequency deviation is greater than the predetermined threshold.

21. The selective call communication system according to claim 16 wherein the erasure marker marks a position of a Reed Solomon symbol as an erasure, and performs a soft decoding error correcting code wherein the position being marked improves the error correcting capability on the Reed Solomon code word.

22. The selective call communication system according to claim 16 wherein the erasure marker marks no more than a predetermined number of Reed Solomon symbols corresponding to an error correcting capability of the Reed Solomon code word.

23. A selective call communication system, comprising:

a selective call device for transmitting a signal modulated as four level frequency shift keying (4FSK) signal and encoded as a Reed Solomon code word and transmitted as an interleaved frequency hopped spread spectrum signal on a plurality of narrow band channels;

a base site transceiver receives the interleaved frequency hopped spread spectrum signal on the plurality of narrow band channels by frequency hopped on the plurality of narrow band channels in a pseudo random sequence;

a Digital Signal Processor (DSP) performs a fast fourier transform on a 4FSK symbol to generate a frequency domain signal; the DSP further comprising:

a comparator for measuring and comparing an energy at a frequency deviation corresponding to the 4FSK symbol to a predetermined threshold;

a determinator for determining when there is an interference signal jamming at least one narrow band channel of the plurality of narrow band channels;

an erasure marker for marking a position of a Reed Solomon symbol of the Reed Solomon code word determined to be jammed as an erasure; and error correcting code word for correcting errors including Reed Solomon symbols marked as erasures in the Reed Solomon code word.

* * * * *